(No Model.)
F. V. PHILLIPS & G. H. DAYTON.
ANTI-RATTLER FOR THILL COUPLINGS.
No. 456,203. Patented July 21, 1891.
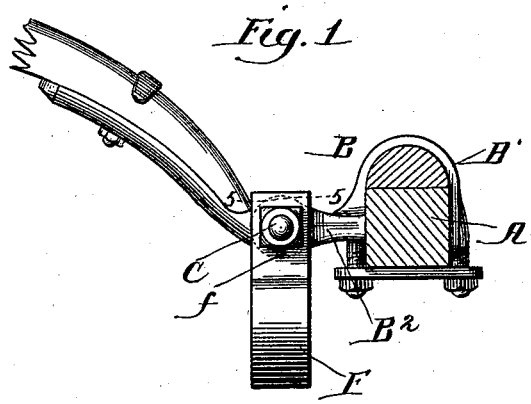
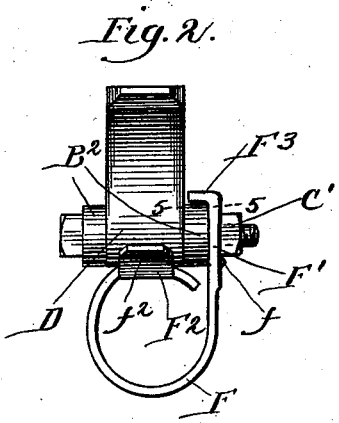
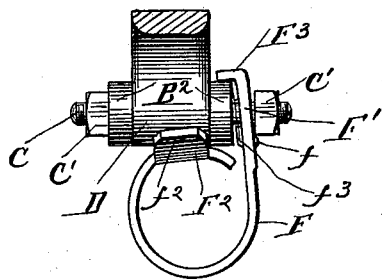
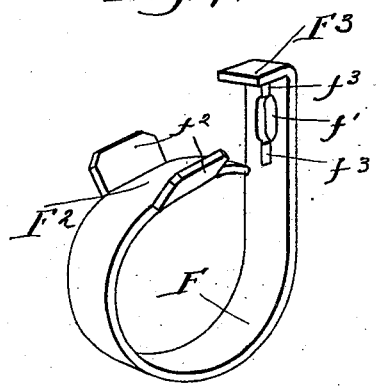
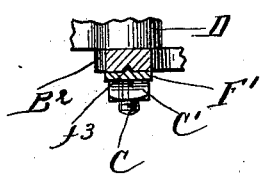
Witnesses:
Jean Elliott
Celeste P. Chapman
Inventors.
Francis V. Phillips
Geo. H. Dayton
By Burton and Burton
their Attorneys
THE NORRIS PETERS CO., PHOTO-LITHO., WASHINGTON, D. C.

UNITED STATES PATENT OFFICE.

FRANCIS V. PHILLIPS AND GEORGE H. DAYTON, OF CHICAGO, ILLINOIS.

ANTI-RATTLER FOR THILL-COUPLINGS.

SPECIFICATION forming part of Letters Patent No. 456,203, dated July 21, 1891.

Application filed January 25, 1890. Serial No. 338,081. (No model.)

*To all whom it may concern:*

Be it known that we, FRANCIS V. PHILLIPS and GEORGE H. DAYTON, citizens of the United States, residing at Chicago, county of Cook, and State of Illinois, have invented certain new and useful Improvements in an Anti-Rattler for Shaft-Couplings, which are fully set forth in the following specification, reference being had to the accompanying drawings, forming a part thereof.

Figure 1 is a sectional side elevation of what is commonly known as the "shaft shackle" or fitting, having the bearing for the shaft, the same having our invention attached, the axle being shown in section. Fig. 2 is a front elevation of the same parts. Fig. 3 is a view similar to Fig. 2, showing the anti-rattler as first placed in position before being tightened up. Fig. 4 is a perspective of the preferred form of our device, as is shown in Figs. 1, 2, and 5. Fig. 5 is a section at the line 7 7 on Figs. 1 and 2.

A is the axle.

B is the shaft-coupling clip, comprising the yoke B', by which it is fastened to the axle in a familiar manner, and has the lugs $B^2 B^2$, constituting the bearing for the pivot-bolt C, by which the shaft-eye D is connected to the clip between the lugs $B^2$. The construction thus far described is the familiar form of such shaft-couplings.

F is the device, which constitutes our invention, for preventing the rattling of such shaft-couplings. Considered generically it is a lever-arm hung loosely on the pivot-bolt of the shaft between the bearing of the same and the head or nut and extending thence around to the side of the shaft-eye against which it bears, the dimensions of the said lever being such that the part which is adapted to bear against the side of the shaft is normally in contact therewith, while the part which hangs on the bolt between the bearing and the head or nut is oblique to the contiguous face of the bearing, so that when the bolt is tightened up, clamping the part of the lever in question between the bearing and the head or nut and straightening it up against the bearing, the part which bears against the side of the eye is forced up firmly thereagainst and takes up the wear or lost motion, which is the occasion of the rattling.

Preferably, because most conveniently, we make such lever bear upon the under side of the eye, though it might with equal effectiveness bear upon the upper side. In Fig. 5 the lever F is shown as first hung loosely on the bolt, the nut being run on not far enough to exert any pressure or produce any clamping effect. It will be observed that as the nut is tightened up and the portion F' of the lever F which is between the bearing and the nut or head, (for it is obviously immaterial on which end of the bolt the device is supported if it is supported only at one end,) the portion $F^2$ will be caused to move upward against the under side of the eye D. The lever should be elastic to such extent as to enable it to exert a sufficiently yielding pressure when it is thus tightened up to follow the eye as it wears its way into the bolt. This is best accomplished by coiling the free end of the lever, as seen in the drawings. From the point of fastening on the pivot-bolt C the spring-lever F is made to extend past the eye of the shaft and far enough from it so that it can be bent up concave toward the eye and still on around in the same direction of curvature until it is convex to the eye, almost completing the circle, (at least three-quarters of a circle is necessary,) and forming an open ring, of which one side $F^2$ rests against the eye, so that as the nut C' is tightened and the coil or ring part N of the elastic lever is forced up against the eye such pressure will coil the ring closer rather than tend to open it out. When thus constructed, continued use of the device does not cause it to lose its effectiveness, as would be the case if it were formed so that the tightening tended to open and straighten out the curve on which to a large extent the elasticity and pressure on the eye depends. We prefer to form this part $F^2$ with lateral lugs $f^2$, which will extend up in front of and behind the eye a short distance, making a seat for the eye on the upper side of the lever F, so that the end of the lever will not follow the eye as the shaft oscillates on its pivot, but will afford a bearing in which the eye will turn. It will be observed that this device is well adapted to operate as a nut-lock, since the same reaction which exerts the pressure against the side of the eye to take up the lost motion will be felt between the nut and bearing, and will constitute a means for holding the nut firmly on the pivot-bolt. As a further means for adapting the device for this additional purpose, we provide the slight protuberance $f$ on the outer surface of the lever, outside a circle which might be inscribed within the square head or nut C' and within a circle which would be circumscribed about such nut, so that as the nut or head is revolved in tightening up the bolt the corners of the nut will crowd past the protuberance and be locked by it. In order to prevent the entire lever swinging on the pivot-bolt as the shaft oscillates, and thereby having a tendency to unscrew the nut or bolt, in addition to the lugs $f^2$ to form a seat for the shaft-eye, a lip $F^3$ may be provided at the upper end, which will overhang the bearing, as seen in Fig. 2. Inasmuch, however, as this device is designed to be applied to shaft-couplings already in use, and of which the size may vary slightly so that the lip $F^3$ might not fit closely enough to prevent the swinging motion of the lever, we deem it best to provide a further device for the same purpose, which consists of the V-shaped tooth $f^3$, formed on the inner surface of the lever, commencing at the eye $f'$ and extending therefrom in any convenient direction. As illustrated, it is made to extend vertically therefrom. This lever F being always made of hardened steel and the clip being usually of wrought or malleable iron and comparatively soft, this tooth $f^3$ will indent the side of the bearing $B^2$ when the lever is first clamped against the same, and the tooth $f^3$, thus forced into the substance of the bearing will secure the lever against turning.

We claim—

1. In combination with the shaft-eye and its pivot-bolt and the bearing of such bolt, an elastic lever-arm retained between the bolt-bearing and its head or nut and extended around to the side of the eye, curved continuously in the same direction and through more than three-quarters of a circle, whereby such lever forms an elastic open ring at the side of the eye adapted to be pressed thereagainst by drawing up the bolt-head or nut, substantially as set forth.

2. In combination with the shaft-eye, its pivot-bolt, and the bearings of such bolt, the spring-arm F, retained between the bearing and the head or nut of the bolt and reacting against the side of the eye and having the projection $f$ upon its outer surface in the path of rotation of the projecting angles of the nut or bolt-head, whereby said spring-arm serves as a lock to prevent the rotation of the bolt or nut, substantially as set forth.

3. In combination with the shaft-eye, the pivot-bolt, and the bearings of such bolt, the spring-arm F, retained between the bearing and the head or nut of the bolt and reacting against the side of the eye, said arm being provided with the tooth $f^3$ upon its inner face, adapted to be forced into the face of the bearing by tightening the pivot-bolt, substantially as set forth.

In testimony whereof we have hereunto set our hands, at Chicago, Illinois, in the presence of two witnesses, this 18th day of January, 1890.

FRANCIS V. PHILLIPS.
GEORGE H. DAYTON.

Witnesses:
CHAS. S. BURTON,
JEAN ELLIOTT.